United States Patent
Garbe et al.

(10) Patent No.: US 10,344,133 B2
(45) Date of Patent: Jul. 9, 2019

(54) PAVEMENT MARKING TAPE WITH MODIFIED POLYURETHANE TOPCOAT

(71) Applicant: 3M INNOVATIVE PROPERTIES COMPANY, St. Paul, MN (US)

(72) Inventors: James E. Garbe, Stillwater, MN (US); Thomas P. Hedblom, Eagan, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 9 days.

(21) Appl. No.: 14/916,739

(22) PCT Filed: Aug. 27, 2014

(86) PCT No.: PCT/US2014/052818
§ 371 (c)(1),
(2) Date: Mar. 4, 2016

(87) PCT Pub. No.: WO2015/034714
PCT Pub. Date: Mar. 12, 2015

(65) Prior Publication Data
US 2016/0208063 A1     Jul. 21, 2016

Related U.S. Application Data

(60) Provisional application No. 61/874,563, filed on Sep. 6, 2013.

(51) Int. Cl.
*C08J 7/04* (2006.01)
*E01F 9/512* (2016.01)
(Continued)

(52) U.S. Cl.
CPC .......... *C08J 7/047* (2013.01); *C08G 18/3821* (2013.01); *C08G 18/4277* (2013.01);
(Continued)

(58) Field of Classification Search
CPC ............ C08G 18/3821; C08G 18/4277; C08G 18/6651; C08G 2101/00; C08J 2300/26;
(Continued)

(56) References Cited

U.S. PATENT DOCUMENTS 3,399,607 A    9/1968   Eigenmann
3,782,843 A    1/1974   Eigenmann
(Continued)

FOREIGN PATENT DOCUMENTS

EP           2436713      4/2012
WO    WO 1997-008947      3/1997
(Continued)

OTHER PUBLICATIONS

International Search Report for PCT International Application No. PCT/US2014/52818, dated Nov. 21, 2014, 2pgs.

*Primary Examiner* — Thao T Tran
(74) *Attorney, Agent, or Firm* — Carlos M. Téllez

(57) ABSTRACT

The inventors of the present disclosure discovered that use of a urea-modified polyurethane coating as the topcoat in a pavement marking tape has numerous advantages. The urea-modified polyurethane topcoat is the reaction product of an aspartic ester polyamine, a polyisocynate, and a polyol. The urea-modified topcoat is adjacent to a base layer. The base layer and topcoat form a pavement marking tape.

9 Claims, 1 Drawing Sheet

(51) Int. Cl.
  *C08G 18/66* (2006.01)
  *C09D 175/04* (2006.01)
  *C08G 18/38* (2006.01)
  *C08G 18/42* (2006.01)
  *C09J 175/04* (2006.01)
  *C08G 101/00* (2006.01)

(52) U.S. Cl.
  CPC ....... C08G 18/6651 (2013.01); C09D 175/04 (2013.01); C09J 175/04 (2013.01); E01F 9/512 (2016.02); *C08G 2101/00* (2013.01); *C08J 2300/26* (2013.01); *C08J 2475/04* (2013.01)

(58) Field of Classification Search
  CPC ..... C08J 2475/04; C08J 7/047; C09D 175/04; C09J 175/04; E01F 9/512
  USPC ................ 428/423.9, 424.7, 424.8
  See application file for complete search history.

(56) References Cited

U.S. PATENT DOCUMENTS

| | | | |
|---|---|---|---|
| 3,935,365 A | 1/1976 | Eigenmann | |
| 4,020,211 A | 4/1977 | Eigenmann | |
| 4,117,192 A | 9/1978 | Jorgensen | |
| 4,490,432 A | 12/1984 | Jordan | |
| 4,988,541 A | 1/1991 | Hedblom | |
| 4,988,555 A | 1/1991 | Hedblom | |
| 4,990,024 A | 2/1991 | Eigenmann | |
| 5,126,170 A | 6/1992 | Zwiener | |
| 5,422,162 A | 6/1995 | Passarino | |
| 5,593,246 A * | 1/1997 | Hedblom | E01F 9/512 404/14 |
| 5,643,655 A | 7/1997 | Passarino | |
| 6,166,106 A * | 12/2000 | Purgett | C08G 18/3821 523/172 |
| 7,342,056 B2 | 3/2008 | Patel et al. | |
| 2005/0079324 A1* | 4/2005 | Haunschild | E01F 9/524 428/143 |
| 2007/0048445 A1 | 3/2007 | DiMario | |
| 2011/0151113 A1 | 6/2011 | Wang | |
| 2012/0183692 A1 | 7/2012 | Becker, IV | |
| 2012/0225992 A1 | 9/2012 | Shalati | |
| 2013/0231426 A1* | 9/2013 | Chen | C08K 5/0008 524/269 |

FOREIGN PATENT DOCUMENTS

| | | |
|---|---|---|
| WO | WO 97/18947 A1 | 5/1997 |
| WO | WO 2008-113075 | 9/2008 |
| WO | WO 2012-074810 | 6/2012 |
| WO | WO 2012-177818 | 12/2012 |

* cited by examiner

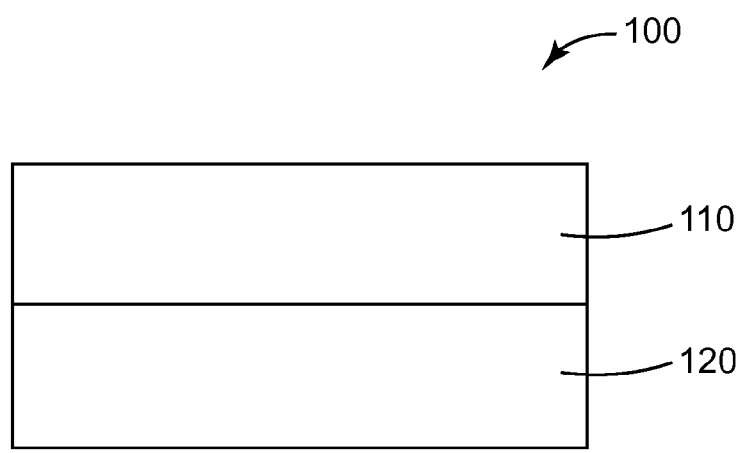

PAVEMENT MARKING TAPE WITH MODIFIED POLYURETHANE TOPCOAT

CROSS REFERENCE TO RELATED APPLICATIONS

This application is a national stage filing under 35 U.S.C. 371 of PCT/US2014/052818, filed Aug. 27, 2014, which claims priority to U.S. Provisional Application No. 61/874,563, filed Sep. 6, 2013, the disclosures of which are incorporated by reference in their entirety herein.

TECHNICAL FIELD

The present disclosure generally relates to road surface marking tapes for use on a roadway surface to provide a traffic regulating lines and/or other traffic information data thereon.

BACKGROUND

Pavement markers (e.g., paints, tapes, and individually mounted articles) guide and direct motorists and pedestrians traveling along roadways and paths. Pavement markers are used on, for example, roads, highways, parking lots, and recreational trails, to form stripes, bars and markings for the delineation of lanes, crosswalks, parking spaces, symbols, legends, and the like. Paint was a preferred pavement marking for many years. The formed or applied traffic lines created by these pavement markers form a part of the road surface and are thus subjected to the wear and destructive action of traffic.

Pavement markers consisting of preformed tapes or strips are well known in the art to be advantageous in comparison to the conventional pavement marking paints. Preformed pavement markers offer significant advantages over paint, such as increased visibility, retroreflectance, improved durability, and temporary and/or removable marking options. Preformed marking tapes are typically formed from a composite structure comprising a support base of calendared rubber compound, a self-adhesive layer, and a topcoat anti-wear layer incorporating anti-skid material and retroreflective elements. Such a composite structure is disclosed in many patents, such as, for example, U.S. Pat. Nos. 3,782,843, 3,935,365, 3,399,607, 4,020,211, 4,117,192, 4,990,024, and 4,988,555 all of which are incorporated by reference in their entirety.

Polyurethane resins have been used in the topcoat layer for many years due to their high tensile and tear strength coupled with abrasion resistance (see, for example, U.S. Pat. No. 5,643,655, incorporated by reference in its entirety.). Pavement marking tapes including a polyurethane topcoat have a high capacity to be deformed, high permanent set, and low elastic return while providing durability. These pavement marking tapes deform readily into intimate contact with irregular pavement surfaces, absorb the energy of wheel impacts without fracture and avoid the stretch-return action that has been found to loosen marking tapes from a roadway pavement. Typical examples of such pavement marking tapes can be found, for example, in U.S. Pat. Nos. 4,117,192 and 4,990,024, both of which are incorporated by reference in their entirety. A negative aspect of such a deformable marking tape relates to its low mechanical properties, in particular, low tensile strength and too high a level of elongation.

Various polyurethane topcoats are known. One such polyurethane topcoat is described in U.S. Pat. No. 5,126,170. The process described in this patent involves reacting a polyol, a polyaspartic ester amine, and a polyisocyanate to form a coating including urea-modified polyurethane.

SUMMARY

A continuing goal in the pavement-marking industry is to find economical products from which to form traffic control stripes having a longer useful life and excellent durability. A significant part of forming an improved pavement marking tape involves forming a topcoat with excellent durability. Many attempts to increase the durability of the topcoat have involved increasing the topcoat hardness. However, the inventors of the present disclosure discovered that increasing topcoat hardness alone does not necessarily or on its own create a superior pavement marking tape. For example, if the topcoat is too stiff, the pavement marking tape will not roll up or will crack when it is rolled.

The inventors of the present disclosure discovered that use of a urea-modified polyurethane coating as the topcoat in a pavement marking tape has numerous advantages. Use of this known type of coating in a pavement marking tape would not have been obvious for a variety of reasons. For example, the use of amines in the topcoat has certain disadvantages including, for example, (1) undesirable cure time and/or cure viscosity profile; and (2) amines directly on certain polymers, such as, for example, polymers containing halogenated compounds, discolors the polymer. However, the inventors of the present disclosure discovered a polurea-modified polyurethane topcoat for use in a pavement marking tape that has acceptable stiffness to achieve optimal topcoat hardness without creating undesirable browning or increased cure time and/or cure viscosity profile. Also, the topcoat demonstrates improved adhesion to the base layer/premix compared to pavement marking topcoats including polyurethanes modified with polyurea linkages formed by the reaction of amines other than polyaspartic ester polyamines Surprisingly, the inventors of the present disclosure discovered that polymeric topcoats having desirable and useful properties can be obtained using a small molar ratio of the aspartic ester polyamine and a polyol.

The inventors of the present disclosure also realized that topcoats including aspartic ester polyamines are less dependent on the selection of the polyol in the topcoat. Thus, polymeric topcoats having desirable physical, chemical and mechanical properties can now be made as the reaction product of mixtures comprising any of a large number of commercially available polyols.

Some embodiments of the present disclosure relate to a pavement marking tape, comprising: a base layer; and a topcoat comprising a urea-modified polyurethane that is the reaction product of an aspartic ester polyamine, a polyisocyanate, and a polyol.

In some embodiments, the aspartic ester polyamine has a molecular weight of at least 460. In some embodiments, the base layer includes at least one non-crosslinked elastomeric polymer. In some embodiments, the non-crosslinked elastomeric polymer is selected from a group consisting of acrylonitrile-butadiene polymers, neoprene, natural rubber, polyacrylates, and styrene-butadiene polymers. In some embodiments, the base layer includes an extender resin that is present between about 10 parts and about 70 parts per 100 parts of non-crosslinked elastomeric polymer. In some embodiments, the extender resin is present in an amount of between about 2% and about 10%. The extender resin can comprise a halogenated polymer or halogenated wax. In some embodiments, the base layer is substantially free of halogenated polymer or halogenated wax.

Some embodiments of the present disclosure relate to a method of forming a pavement marking tape, comprising: forming a topcoat including (a) a first topcoat component including a polyol and an aspartic ester polyamine; and (b) a second component including a polyisocyanate; and applying the topcoat to a base layer.

BRIEF DESCRIPTION OF DRAWINGS

FIG. 1 is a schematic diagram of an exemplary pavement marking tape in accordance with the present disclosure.

The figures are not necessarily to scale. Like numbers used in the figures refer to like components. However, it will be understood that the use of a number to refer to a component in a given figure is not intended to limit the component in another figure labeled with the same number.

In the following detailed description, reference may be made to the accompanying drawing that forms a part hereof and in which is shown by way of illustration one exemplary specific embodiment. It is to be understood that other embodiments are contemplated and may be made without departing from the scope or spirit of the present disclosure.

DETAILED DESCRIPTION

Various embodiments and implementations will be described in detail. These embodiments and implementations should not be construed as limiting the scope of the present application in any manner, and changes and modifications may be made without departing from the spirit and scope of the disclosure. The scope of the present application should be determined solely by the claims.

FIG. 1 is a schematic diagram of a pavement marking tape 100 in accordance with the present disclosure. Pavement marking tape 100 includes a base layer 110 adjacent to a topcoat layer 120. As shown in FIG. 1, base layer 110 is a substantially flat or planar surface. However, base layer 110 can have other constructions. For example, the base layer can include protrusions that can be, for example, integral with or added to the base layer. Additionally, the protrusions can be sinusoidal or can each independently having a top surface and a side surface. In some embodiments, the protrusions protrude from only one surface of the base layer. In other embodiments, the protrusions extend from both surfaces of the body layer. Where present, the protrusions can have any dimension and can be arranged in any way (including, for example, randomly or in a repeating or regular pattern).

Base Layer. The base layer can include any desired composition. Some exemplary suitable base layer compositions are described in, for example, U.S. Pat. Nos. 4,117, 192; 4,490,432; 5,422,162; and 5,643,655 and PCT Publication No. WO2012/074810, all of which are incorporated in their entirety herein.

In some embodiments, the base layer includes at least one non-crosslinked elastomeric polymer. In some embodiments, the base layer comprises more than one non-crosslinked elastomeric polymer. The non-crosslinked elastomeric polymer can comprise any non-crosslinked elastomeric polymer. Some exemplary non-crosslinked elastomeric polymers include acrylonitrile-butadiene polymers, neoprene, natural rubber, polyacrylates, and styrene-butadiene polymers. In some embodiments, the non-crosslinked elastomeric polymer is present in an amount of between about 6% and about 15% by weight.

In some embodiments, the base layer includes at least one extender resin. As used herein, the term "extender resin" refers to a second resin that is different than the non-crosslinked elastomeric polymer, where present. In some embodiments, the extender resin is miscible with, or forms a single phase with, the non-crosslinked elastomeric polymer. In some embodiments, the extender resin plasticizes the non-crosslinked elastomeric polymer. Representative examples of extender resins that can be used in the base layer include hydrocarbon resins including polystyrene, halogenated polymers such as poly(vinyl chloride), and halogenated waxes such as chlorinated waxes. In some embodiments, the extender resin is present in an amount of less than 10%. In some embodiments, the extender resin is present in an amount of between about 2% and about 10%. In some embodiments, the extender resin is present in a weight percent of between about 10 and about 70 parts per 100 parts of non-crosslinked elastomeric polymer. In some embodiments, the extender resin comprises less than 10 weight percent halogenated polymer or halogenated wax. In some embodiments, the extender resin includes less than 5 weight percent halogenated polymer or halogenated wax. In some embodiments, the extender resin includes less than 1 weight percent halogenated polymer or halogenated wax.

In some embodiments, the base layer is substantially free of halogenated polymer. As used herein, the term "substantially free" means less than one part per 100 parts. In some embodiments, the base layer is substantially free of chlorine.

In some embodiments, the base layer includes at least one thermoplastic reinforcing polymer. Some exemplary thermoplastic reinforcing polymers include, for example, a hydrocarbon polymer such as a polyolefin, a vinyl copolymer, or a polyurethane. In some embodiments, the base layer includes at least one thermoplastic reinforcing polymer that is present in an amount of between about 5 parts and about 100 parts per 100 parts of non-crosslinked elastomeric polymer. In some embodiments, the thermoplastic reinforcing polymer(s) is present in an amount of between about 2% and about 6% by weight.

In some embodiments, the base layer includes pigments and/or fillers. In some embodiments, the pigments are white or yellow pigments. Some exemplary pigments include, for example, titanium dioxide, pearlescent pigments or yellow pigments available under the trade designation YT 808D or YT 800D from Claiant International, Muttenz, Switzerland. Some exemplary fillers include, for example, talc, calcium carbonate, processing aids, stabilizers, retroreflective elements (e.g., retroreflective beads or elements), or skid-resisting particles (e.g., sand particles).

Topcoat Layer. In some embodiments, the topcoat layer includes a reaction product of a polyol, an aspartic ester polyamine, and a polyisocyanate. The topcoat includes a urea-modified polyurethane made from these reaction products.

Polyol. In some embodiments, the polyol includes a compound having at least 2 hydroxyl groups. The polyol can include, for example, a compound having 2 hydroxyl groups, 3 hydroxyl groups, 4 hydroxyl groups, or more than 4 hydroxyl groups. The polyol can include more than one compound, each independently having at least 2 hydroxyl groups. The polyol can include 2, 3, 4, or more than 4 compounds, each independently having at least 2 hydroxyl groups. In some embodiments, the polyol includes more than one compound, each having the same number of hydroxyl groups (e.g., 2 hydroxyl groups, 3 hydroxyl groups, 4 hydroxyl groups, or more than 4 hydroxyl groups). In some embodiments, the polyol includes at least a first compound and a second compound, wherein the first compound has a number of hydroxyl groups that is different from the number of hydroxyl groups in the second compound. As a non-limiting example, one exemplary embodiment includes a polyol that includes a first compound having 2 hydroxyl groups and a second compound having more than 2 hydroxyl groups (e.g., 3, 4, or more than 4 hydroxyl groups). In another non-limiting example, a polyol can include a first compound having 3 hydroxyl groups and a second compound having more than 3 hydroxyl groups (e.g., 4 or more hydroxyl groups).

In some embodiments, the polyol includes at least one compound that includes at least 2 hydroxyl groups and having a molecular weight (in grams of polyol per mole of polyol) of less than 4000. In some embodiments, the molecular weight is less than 3500. In some embodiments, the molecular weight is less than 3000. In some embodiments, the molecular weight is less than 2800. In some embodiments, the molecular weight is less than 2400. In some embodiments, the molecular weight is less than 2000. In some embodiments, the molecular weight is less than 1800. In some embodiments, the molecular weight is less than 1600. In some embodiments, the molecular weight is less than 1400. In some embodiments, the molecular weight is less than 1200. In some embodiments, the molecular weight is less than 1000. In some embodiments, the molecular weight is less than 900. In some embodiments, the molecular weight is less than 800. In some embodiments, the molecular weight is less than 700. In some embodiments, the molecular weight is less than 600. In some embodiments, the molecular weight is less than 500. In some embodiments, the molecular weight is less than 400. In some embodiments, the molecular weight is less than 300. In some embodiments, the molecular weight is less than 200. In some embodiments, the molecular weight is less than 100.

The polyol can comprises any combination of primary, secondary, or tertiary hydroxyl groups. In some embodiments, the polyol can comprise any combination of primary or secondary hydroxyl groups. In some embodiments, the polyol comprises primary hydroxyl groups.

The polyol can comprise linear, branched, or cyclic structures, or any combination of linear, branched, or cyclic structures. The linear, branched or cyclic structures can comprise hydrocarbon groups, including hydrocarbon groups that further comprise at least one heteroatom such as oxygen, nitrogen, silicon or sulfur. The linear, branched, or cyclic structures can comprise at least one organic functional group such as, for example, a ketone group, an ester group, and/or an amide group. In some embodiments, the linear, branched, or cyclic structures comprise more than one organic functional group. In some embodiments, the polyol comprises linear groups comprising at least one heteroatom and further comprising at least one ester group.

Some exemplary polyols suitable for use in the compositions, topcoats, and tapes described herein include ethylene glycol, glycerol, diethylene glycol, triethylene glycol, tetraethylene glycol, pentaerythritol, 1,6-hexanediol, polyethylene glycol, polypropylene glycol, polytetramethylene glycol, polyethoxylated polyols (including polyethoxylated diols and polyethoxylated triols), polycarbonate polyols (including polycarbonate diols), and polyester polyols including polyester diols, polyester triols, and polyester tetraols. Some exemplary polyester polyols include polycaprolactone diols, polycaprolactone triols and polycaprolactone tetraols. Some exemplary polycaprolactone diols include those available under the trade designation CAPA 2043, CAPA 2054, CAPA 2201A, and CAPA 2302A, each available from Perstorp Polyols, Inc., Toledo, Ohio. Some exemplary polycaprolactone triols include those available under the trade designation CAPA 3022, CAPA 3031A, CAPA 3050, and CAPA 3091, each available from Perstorp Polyols, Inc.

Aspartic Ester. The aspartic ester polyamine comprises at least one compound having the structure

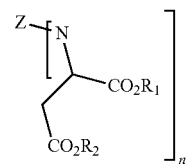

wherein $R_1$ and $R_2$ independently comprise linear, branched or cyclic alkyl groups having at least 1 carbon atom, Z comprises a linear, branched or cyclic linking group, and n is an integer from 1 to 6. In some embodiments, $R_1$ and $R_2$ independently comprise linear, branched or cyclic alkyl groups having 1 to 10 carbon atoms, 1 to 8 carbon atoms, 1 to 6 carbon atoms, 1 to 4 carbon atoms, or 1 to 2 carbon atoms. In some embodiments, $R_1$ and $R_2$ independently methyl groups or ethyl groups. $R_1$ and $R_2$ independently can comprise linear, branched or cyclic groups having at least one heteroatom such as oxygen, nitrogen, or sulfur. In some embodiments, Z is a divalent linking group, e.g., a linear, branched, or cyclic alkylene group. In some embodiments, $R_1$ and $R_2$ comprise ethyl groups, Z comprises a divalent group, and n is 2. In some embodiments, the aspartic ester polyamine comprises the structure

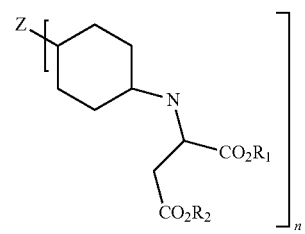

wherein Z is a methylene group, $R_1$ and $R_2$ are independently methyl or ethyl groups, and n is 2. Representative examples of aspartic ester polyamines include polyamines available under the trade designation DESMOPHEN NH 1220, DESMOPHEN NH 1420 and DESMOPHEN NH 1520, each available from Bayer MaterialScience, Pittsburgh, Pa.

Polyisocynate. The polyisocyanate comprises at least one organic compound having at least 2 isocyanate (—NCO) groups in a single molecule such as diisocyanates, triisocyanates, tetraisocyanates, etc. The polyisocyanate can comprise oligomeric or polymeric isocyanates. Cyclic and/or linear polyisocyanate molecules may usefully be employed. Useful polyisocyanates include, for example, bis(4-isocyanatocyclohexyl) methane such as available from Bayer MaterialScience., Pittsburgh, Pa. under the trade designation "Desmodur W"; isophorone diisocyanate (IPDI), and hexamethylene diisocyanate (HDI) such as commercially available from Aldrich Chemical Co., Milwaukee, Wis. In some embodiments, the polyisocyanate comprises at least one polyisocyanate each having at least 2 isocyanate groups, and each independently having a molecular weight (in grams of polyisocyanate per mole of polyisocyanate) less than 100, less than 200, less than 300, less than 400, less than 500, less than 600, less than 700, less than 800, less than 900, less than 1000, less than 1200, less than 1400, less than 1600, less than 1800, less than 2000, less than 2400, less than 2800, less than 3000, less than 3500, or less than 4000.

In some embodiments, the polyisocyanate comprises more than one polyisocyanate, each independently having at least 2 isocyanate groups and each independently having a molecular weight (in grams of polyisocyanate per mole of polyisocyanate) greater than 50, greater than 100, greater than 200, greater than 300, greater than 400, greater than 500, greater than 600, greater than 700, greater than 800, greater than 900, greater than 1000, greater than 1200, greater than 1400, greater than 1600, greater than 1800, greater than 2000, greater than 2400, greater than 2800, greater than 3000, greater than 3500, or greater than 4000.

Representative examples of suitable polyisocyanates include polyisocyanates containing biuret groups, such as the biuret adduct of hexamethylene diisocyanate (HDI) available from Bayer MaterialScience, Pittsburgh, Pa. under the trade designation DESMODUR N 100, polyisocyanates containing isocyanurate groups, such as that available from Bayer MaterialScience under trade designation DESMODUR N 3300A, or the polyisocyanate available from Bayer MaterialScience under the trade designation DESMODUR N 3900, as well as polyisocyanates comprising urethane groups, uretdione groups, carbodiimide groups or allophonate groups.

In some embodiments, the topcoat includes pigments and/or fillers. In some embodiments, the pigments are white or yellow pigments. Some exemplary pigments include, for example, titanium dioxide, pearlescent pigments or yellow pigments available under the trade designation YT 808D or YT 800D from Claiant International, Muttenz, Switzerland. In some embodiments, the topcoat comprises greater than 5 weight percent, greater than 10 weight percent, greater than 15 weight percent, greater than 20 weight percent, greater than 25 weight percent, or greater than 30 weight percent pigment. In some embodiments, the topcoat comprises less than 50 weight percent, less than 40 weight percent, less than 30 weight percent, less than 20 weight percent, less than 10 weight percent, or less than 5 weight percent pigment. Some exemplary fillers include, for example, talc, calcium carbonate, processing aids, stabilizers, retroreflective elements (e.g., retroreflective beads or elements), or skid-resisting particles (e.g., sand particles).

In some embodiments, the topcoat comprises a polyol and an aspartic ester polyamine present such that the ratio of the number of equivalents of polyol hydroxyl groups is not less than the number of equivalents of aspartic ester amine amino groups. That is, the ratio of the number of equivalents of hydroxyl groups to the number of equivalents of amino groups is not less than 1:1.

In some embodiments, the topcoat is prepared by first combining at least one polyol, at least one aspartic ester polyamine, and optional pigments, fillers, molecular sieves, processing aids, stabilizers, or retroreflective elements. This mixture can then be combined with at least one polyisocyanate. The resultant mixture can then be applied to the first surface of a base layer by any application method such as, for example, spraying, die coating, roll coating, screen coating, curtain coating or knife coating. In embodiments wherein the base layer comprises integral protrusions, the topcoat can be applied to the tops of the protrusions, the sides of the protrusions, or both, as is described in, for example, U.S. Pat. Nos. 4,988541 and 4,988,555, both of which are incorporated in their entirety herein. In some embodiments, retroreflective beads are spinkled onto the surface while the topcoat is in its uncured state. In some embodiments, the topcoated base layer is covered with beads and the excess beads are removed by gravity. Typically, retroreflective glass beads are applied to the topcoat before it cures or hardens.

In some embodiments, the pavement marking tape further includes an adhesive adjacent to the surface of the base layer not adjacent to the topcoat. The adhesive can be any adhesive, including a pressure sensitive adhesive such as an acrylic or rubber-based adhesive, a hot melt adhesive, a contact adhesive, or a thermoset adhesive such as an epoxy adhesive.

The following examples describe some exemplary constructions of various embodiments of the retroreflective articles and methods of making the retroreflective articles described in the present application. The following examples describe some exemplary constructions and methods of constructing various embodiments within the scope of the present application. The following examples are intended to be illustrative, but are not intended to limit the scope of the present application.

EXAMPLES

Unless otherwise noted, chemicals were or can be obtained from Sigma-Aldrich Co., St. Louis, Mo.

Base layers were prepared according to the procedure described in Example 1 in U.S. Pat. No. 4,490,432.

Examples 1-12 and Comparative Examples 1-6

Examples 1-12 and Comparative Examples 1-6 were made using the specific materials listed in Table 1 below. For each example or comparative example, a urea-modified polymer was made by combining 10 grams of the polyisocyanate specified in Table 1 and sufficient amine/polyol mixture to provide a mixture having approximately a 10% molar excess of isocyanate. Each combination of reactants was combined in beakers with 80-150 parts per million of dibutyltin dilaurate, added as a 10 weight percent solution in methyl ethyl ketone. The resulting mixture was mixed by hand with a spatula. The mixtures were then poured into aluminum weighing dishes, spread onto release liners, and spread onto flat tape base layer to cure. The samples were cured in a forced air oven at 160° F. for 16 hours (Examples 1-9 and Comparative Examiners 1-6). Examples 10-12, 14-16, and Comparative Example 7 were cured in a forced air oven at 250° F. for 1.5 hours. Example 13 was cured in a forced air oven at 280° F. for 30-45 minutes to ensure complete cure.

TABLE 1

Examples 1-12 and Comparative Examples 1-6

| Example | Polyol (weight) | Polyamine (weight) | Polyisocyanate |
|---------|-----------------|--------------------|----------------|
| 1 | CAPA 2054 (12.0 g) | NH1420 (1.0 g) | N 3300A |
| 2 | CAPA 2054 (11.0 g) | NH1420 (2.0 g) | N 3300A |
| 3 | CAPA 2054 (9.0 g) | NH1420 (4.0 g) | N 3300A |
| 4 | CAPA 2077A (12.0 g) | NH1420 (5.0 g) | N 3900 |
| 5 | CAPA 2077A (9.5 g) | NH1420 (7.0 g) | N 3900 |
| 6 | CAPA 3022 (4.9 g) | NH1420 (1.0 g) | N 3900 |
| 7 | CAPA 3022 (4.5 g) | NH1420 (2.0 g) | N 3900 |
| 8 | CAPA 3022 3.8 g) | NH1420 (4.0 g) | N 3900 |
| 9 | CAPA 3022 (3.0 g) | NH1420 (6.0 g) | N 3900 |
| 10 | CAPA 3091 (11.0 g) | NH1520 (4.2 g) | N 3900 |

TABLE 1-continued

Examples 1-12 and Comparative Examples 1-6

| Example | Polyol (weight) | Polyamine (weight) | Polyisocyanate |
|---------|-----------------|---------------------|----------------|
| 11      | CAPA 3050 (7.8 g) | NH1420 (1.0 g)   | N 3300A        |
| 12      | CAPA 3050 (5.8 g) | NH1420 (4.0 g)   | N 3300A        |
| CE 1    | CAPA 3022 (5.3 g) | n/a              | N 3900         |
| CE 2    | CAPA 2077A (19.0 g) | n/a            | N 3900         |
| CE 3    | CAPA 2054 (12.8 g) | n/a             | N 3300A        |
| CE 4    | CAPA 2054 (12.0 g) | CL1000 (0.6 g)  | N 3900         |
| CE 5    | CAPA 3050 (5.8 g) | CL1000 (2.3 g)   | N 3900         |
| CE 6    | CAPA 3091 (11.0 g) | CL1000 (2.3 g)  | N 3300A        |

"Desmodur N 3900" and "N 3900" independently refer to a polyisocyanate obtained from Bayer MaterialScience LLC, Pittsburgh, Pa.

"Desmodur N 3300A" and "N 3300A" independently refer to a polyisocyanate obtained from Bayer MaterialScience LLC, Pittsburgh, Pa.

"Desmophen NH 1420" and "NH1420" independently refer to an aspartic ester polyamine obtained from Bayer MaterialScience LLC, Pittsburgh, Pa.

"Desmophen NH 1520" and "NH1520" independently refer to an aspartic ester polyamine obtained from Bayer MaterialScience LLC, Pittsburgh, Pa.

"CAPA 2054" refers to a polycaprolactone diol obtained from Perstorp Polyols, Inc., Toledo, Ohio.

"CAPA 2077A" refers to a polycaprolactone diol obtained from Perstorp Polyols, Inc., Toledo, Ohio.

"CAPA 3022" refers to a polycaprolactone triol obtained from Perstorp Polyols, Inc., Toledo, Ohio.

"CAPA 3050" refers to a polycaprolactone triol obtained from Perstorp Polyols, Inc., Toledo, Ohio.

"CAPA 3091" refers to a polycaprolactone triol obtained from Perstorp Polyols, Inc., Toledo, Ohio.

"CLEARLINK 1000" and "CL1000" independently refer to a diamine available from Dorf Ketal Chemicals LLC, Houston, Tex.

"TiO$_2$" refers to powdered titanium dioxide available under the trade designation Ti-PURE R-960 from E.I. du Pont de Nemours and Co., Wilmington, Del.

"CaCO$_3$" refers to powdered calcium carbonate available under the trade designation OMYACARB 5-FL from Omya, Inc., Cincinnati, Ohio.

"ZN-1" refers to a molecular sieve powder available under the trade designation SYLOID ZN-1 from W.R. Grace & Co., Columbia, Md.

n/a means that none of the listed component was present.

Examples 13-16 and Comparative Example 7

Examples 13-16 and Comparative Example 7 were made using the specific materials listed in Table 2 below. In each Example or Comparative Example, a urea-modified polymer was made by combining 10 grams of Desmodur N 3900 and sufficient amine/polyol mixture to provide a mixture having approximately a 10% molar excess of isocyanate. In addition, the compositions of Examples 13-16 and Comparative Example 7 comprised titanium dioxide pigment, calcium carbonate filler, and molecular sieve powder drying agent, as shown in Table 2.

TABLE 2

Examples 13-16 and Comparative Example 7.

| Example | Polyol (weight) | Amine (weight) | TiO$_2$ | CaCO$_3$ | ZN-1 |
|---------|-----------------|----------------|---------|----------|------|
| 13      | CAPA 3091 (13.3 g) | NH1520 (2.0 g) | 10.0 g | 5.0 g | 2.0 g |
| 14      | CAPA 2054 (12.0 g) | NH1420 (1.0 g) | 10.0  | 3.0 g | 2.0 g |
| 15      | CAPA 3022 (4.9 g)  | NH1420 (1.0 g) | 5.0 g | n/a   | 1.0 g |
| 16      | CAPA 3050 (7.8 g)  | NH1420 (1.0 g) | 6.0 g | n/a   | 1.0 g |
| CE 7    | CAPA 3050 (7.8 g)  | CL1000 (0.6 g) | 6.0 g | n/a   | 1.0 g |

Adhesion of the compositions of Examples 13-16 and Comparative Example 7 to a pavement marking tape base layer was assessed by applying the composition to a surface of a base layer, allowing the composition to cure or harden as described above, and determining the relative bonding of the cured or hardened composition to the base layer.

Relative bonding was assessed by 1) bending and folding the coated pavement marking tape base layers and then observing the ease with which the coating could be peeled or picked off of the base layer; and 2) allowing the coated samples to stand at room temperature for 3 days, followed by immersing and soaking the sample in water for 3 days at room temperature and then observing the ease with which the coating could be manually peeled or picked off of the base layer using a small metal spatula. Each of the coatings of the compositions of Examples 13-16 were observed to bond more strongly to the base layers than the coating of Comparative Example 7. The coatings of Examples 13-16 remained bonded to each of the base layers whereas the coating of Comparative Example 7 could be readily peeled or picked off of the base layers.

All references mentioned herein are incorporated by reference in their entirety.

As used herein, the words "on" and "adjacent" cover both a layer being directly on and indirectly on something, with other layers possibly being located therebetween.

As used herein, the terms "major surface" and "major surfaces" refer to the surface(s) with the largest surface area on a three-dimensional shape having three sets of opposing surfaces.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. All numerical ranges are inclusive of their endpoints and non-integral values between the endpoints unless otherwise stated.

As used in this specification and the appended claims, the singular forms "a", "an", and "the" encompass embodiments having plural referents, unless the content clearly dictates otherwise.

As used in this disclosure and the appended claims, the term "or" is generally employed in its sense including "and/or" unless the content clearly dictates otherwise.

The phrases "at least one of" and "comprises at least one of" followed by a list refers to any one of the items in the list and any combination of two or more items in the list.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present disclosure will become apparent to those skilled in the art without departing from the spirit and scope of the present disclosure. The scope of the present application should, therefore, be determined only by the following claims.

What is claimed is:

1. A pavement marking tape, comprising:
    a base layer comprising
        6-15 wt % of at least one non-crosslinked elastomeric polymer, and
        an extender resin that comprises a halogenated polymer,
        wherein the base layer is substantially free of chlorinated polymer; and
    a topcoat comprising a urea-modified polyurethane that is the reaction product of a topcoat composition comprising an aspartic ester polyamine, a polyisocyanate, and a polyol, wherein the aspartic ester polyamine has a molecular weight of at least 460.

2. The pavement marking tape of claim 1, wherein a ratio of the number of equivalents of hydroxyl groups in the polyol to the number of equivalents of amino groups in the aspartic ester polyamine in the topcoat composition is greater than 1:1.

3. The pavement marking tape of claim 1, wherein in the base layer the extender resin is present in an amount of between about 10 and about 70 parts per 100 parts of non-crosslinked elastomeric polymer, by weight.

4. The pavement marking tape of claim 3, wherein the non-crosslinked elastomeric polymer is chosen from acrylonitrile-butadiene polymers, neoprene, natural rubber, polyacrylates, and styrene-butadiene polymers.

5. The pavement marking tape of claim 1, wherein the halogenated polymer comprises a halogenated wax.

6. A method of forming a pavement marking tape, comprising:
    forming a topcoat comprising a reaction product of a mixture comprising
        (a) a first topcoat component comprising a polyol and an aspartic ester polyamine, wherein a ratio of the number of equivalents of hydroxyl groups in the polyol to the number of equivalents of amino groups in the aspartic ester polyamine in the mixture is greater than 1:1; and
        (b) a second component comprising a polyisocyanate; and
    applying the topcoat to a base layer, the base layer comprising
        6-15 wt % of at least one non-crosslinked elastomeric polymer, and
        an extender resin that comprises a halogenated polymer,
        wherein the base layer is substantially free of chlorinated polymer.

7. The method of claim 6, wherein the aspartic ester polyamine has a molecular weight of at least 460.

8. The method of claim 6, wherein the halogenated polymer comprises a halogenated wax.

9. A pavement marking tape, comprising:
    a base layer comprising
        6-15 wt % of at least one non-crosslinked elastomeric polymer, and
        an extender resin that comprises a halogenated wax, wherein the base layer is substantially free of chlorinated polymer; and
    a topcoat comprising a urea-modified polyurethane that is the reaction product of a topcoat composition comprising an aspartic ester polyamine, a polyisocyanate, and a polyol, wherein the aspartic ester polyamine has a molecular weight of at least 460, and wherein a ratio of the number of equivalents of hydroxyl groups in the polyol to the number of equivalents of amino groups in the aspartic ester polyamine in the topcoat composition is greater than 1:1.

* * * * *